(No Model.)

J. M. SHOEMAKE.
STUMP EXTRACTOR.

No. 458,696.  Patented Sept. 1, 1891.

Witnesses
M. E. Fowler
H. F. Riley

Inventor
James M. Shoemake

By his Attorneys,
C. A. Snow & Co.

UNITED STATES PATENT OFFICE.

JAMES M. SHOEMAKE, OF MAGGART, TENNESSEE.

STUMP-EXTRACTOR.

SPECIFICATION forming part of Letters Patent No. 458,696, dated September 1, 1891.

Application filed May 9, 1891. Serial No. 392,174. (No model.)

*To all whom it may concern:*

Be it known that I, JAMES M. SHOEMAKE, a citizen of the United States, residing at Maggart, in the county of Smith and State of Tennessee, have invented a new and useful Stump-Extractor, of which the following is a specification.

The invention relates to improvements in stump-extractors.

The object of the present invention is to simplify and improve the construction of stump-extractors, and to provide means for controlling the grapple, and to enable the same to be readily directed by the operator.

The invention consists of the construction and novel combination and arrangement of parts hereinafter fully described, illustrated in the accompanying drawings, and pointed out in the claims hereto appended.

Figure 1:
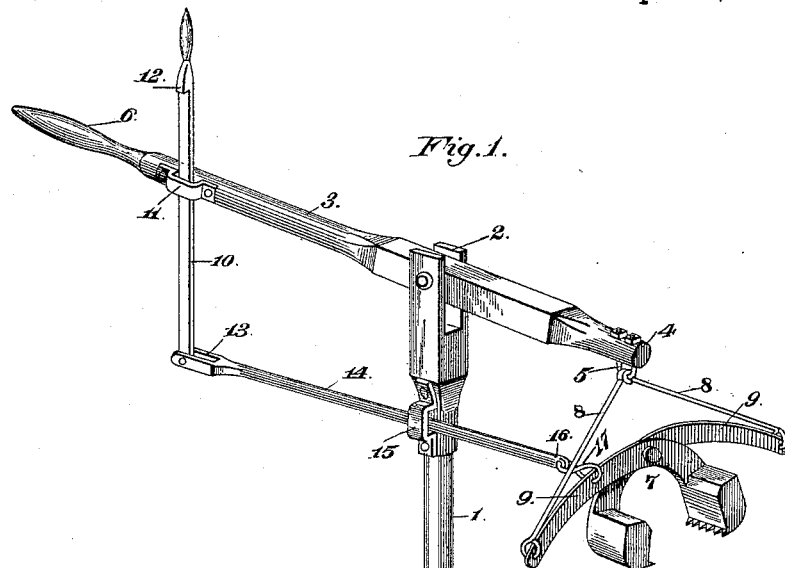
Figure 2:
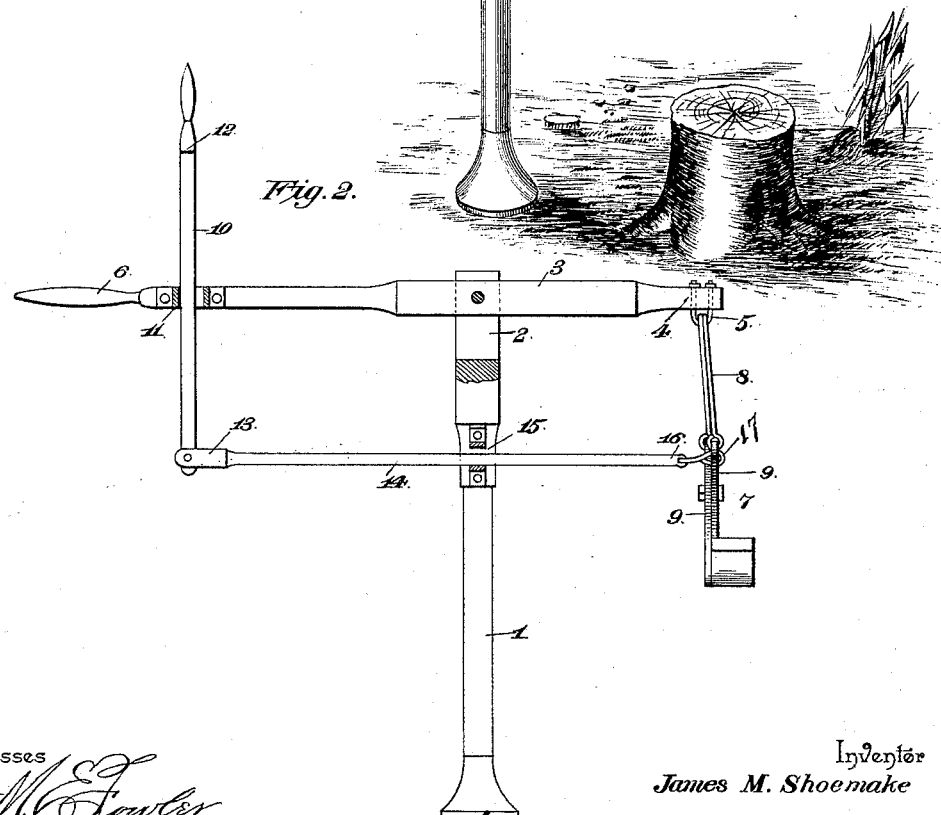

In the drawings, Figure 1 is a perspective view of a stump-extractor embodying the invention. Fig. 2 is a side elevation partly in section.

Referring to the accompanying drawings, 1 designates a standard having its upper end bifurcated, and pivoted in the bifurcation 2 is a lever 3, which has one end 4 provided with an eye 5, and the other end 6 is formed into a handle. The eye 5 is connected with a grapple 7 by rods 8, and the grapple is composed of curved members 9, pivoted together and having their lower ends formed into jaws adapted to engage the stump of a tree. The grapple is controlled by a lever 10, which has its upper end formed into a handle and is loosely arranged in a keeper 11, arranged on one side of the lever 3, and the lever 10 is provided near its upper end with a shoulder 12, which limits the downward movement of the lever and prevents the same falling from the keeper 11. The lower end of the lever 10 is pivoted in a bifurcation 13 of a bar 14, which connects the lever 10 with the grapple 7, and which is arranged in a keeper 15 of the standard 1 and has its end 16 secured to one of the members of the grapple by a twisted link 17. Both the lever 10 and the bar 14 are capable of longitudinal movement in the keepers 11 and 15, and are thereby adapted to give perfect control of the grapple and enable the operator to direct the same as desired.

It will be seen that simple, inexpensive, and efficient means are provided for giving the operator control of the grapple and of enabling him to direct the same as desired without leaving his position at the handle end of the lever 3.

What I claim is—

1. The combination, in a stump-extractor, of the standard, the lever 3, pivoted to the standard, the grapple connected with the lever, the lever 10, loosely mounted on the lever 3 and capable of longitudinal movement, and the bar loosely mounted on the standard and capable of longitudinal movement and connecting the lever 10 and the grapple, substantially as described.

2. The combination of the standard provided with a keeper, the lever 3, pivoted to the standard and provided with a keeper 11, the grapple connected with the lever 3, the lever 10, loosely arranged in the keeper 11, and the bar 14, similarly arranged in the keeper 15 and connecting the lever 10 and the grapple, substantially as described.

In testimony that I claim the foregoing as my own I have hereto affixed my signature in presence of two witnesses.

JAMES M. SHOEMAKE.

Witnesses:
 S. L. JOHNSON,
 E. S. W. KIEMAYERS.